United States Patent Office 2,956,308
Patented Oct. 18, 1960

2,956,308

CHEMICAL TREATMENT OF SHAPED POLYMERIC ARTICLES

Roger M. Schulken, Jr., and Harmon Long, Kingsport, Tenn., assignors to Eastman Kodak Company, Rochester, N.Y., a corporation of New Jersey No Drawing. Filed May 21, 1958, Ser. No. 736,688

8 Claims. (Cl. 18—47.5)

This invention relates to a process for the aftertreatment of polymeric articles. More particularly this invention concerns a process for the after-treatment of articles such as films and fibers which have been formed from the sulfone acid-diol type of high polymer material which remain substantially uncrystallized by any known heat treatment and yet are crystallized by treatment with certain organic liquids.

This application is a continuation-in-part of our application Serial No. 474,276, now Patent No. 2,856,636.

In recent years considerable activity has been directed to the manufacture of formed articles from polymeric materials, particularly materials which are referred to herein as high polymers. For example, there are presently manufactured fibers, films and the like formed products from high polymeric materials, of which the so-called terephthalic type of polyester is illustrative.

In fabricating such polymeric materials into articles, as for example in preparing fibers, the polymer in the form of flakes or other particles, is melted under certain conditions and extruded or otherwise forced through forming members to produce the article such as a fiber. In making film, the polymeric material may likewise be melted and forced through a die to form the film. Or, in some instances, solutions of the polymer may be made and the solution cast into films, spun into fibers or otherwise formed into shaped articles.

The products as first formed by the aforementioned extrusion or other forming procedure, may not be especially suitable for use. Hense, such initially formed articles have been drawn or stretched at a temperature in the range of 80–130° C. and then the formed product subjected to a heat treatment for heat setting or stabilizing the formed article. Such heat treatment is quite frequently applied to the formed article while the article is under tension or restraint. For example, in the instance of a film or sheet which has been stretched several hundred percent both longitudinally and laterally, the film, while still under the tension of the tentering apparatus, is subjected to the heat treatment.

There are certain types of high polymeric materials which we generically refer to herein as non-heat-setting sulfone-diol polymers, which do not respond to the type of after-treatment which has heretofore been used on many high polymer materials. When such non-heat-setting sulfone-diol materials are processed in the usual manner they have lower strength properties, are subject to embrittlement, craze on contact with certain liquids and have lower heat distortion temperatures. When these special materials are stretched under ordinary conditions and then crystallized, they are extremely brittle.

It is, therefore, apparent that the development of an after-treatment process which may be applied to the non-heat-setting sulfone-diol type of polymer represents a highly desirable result. After investigation and experimentation we have discovered a method whereby articles formed from the non-heat-setting sulfone-diol type of polymer may not only be suitably processed, but highly superior formed products may be produced. That is, the formed products prepared in accordance with the present invention are tougher, have much higher heat distortion temperatures and otherwise exhibit improved properties.

This invention has for one object to provide a new process for the after-treatment of high polymeric materials for imparting certain improvements thereto. A particular object is to provide a process for the after-treatment of articles formed from non-heat-setting sulfone-diol type of high polymer. Still another object is to provide a method for processing articles such as films and fibers which are formed from the aforesaid sulfone-diol type of polymeric material. Still another object is to provide a treatment applicable to formed articles of the aforesaid type of polymer whereby the treated article is rendered tough, has high heat distortion temperatures, improved modulus and stiffness, and the like. Still another object is to provide an after-treatment process for articles formed from the high polymer of the class indicated which includes heating the formed article during processing at higher than usual temperatures. Still another object is to provide an improved after-treatment which includes a combination of treating steps of heating and chemical treatment. Still a further object is to produce an article formed of non-heat-setting sulfone-diol polymer, which article possesses high modulus, high stiffness, high distortion temperature and good dimensional stability. Other objects will appear hereinafter.

As indicated above, we have found that the non-heat-setting sulfone-diol type of polymer with which the present invention is particularly concerned, does not respond to the usual after-treatment which is applied to many polymers. The composition of some of the non-heat-setting sulfone-diol type of polymer which is used to make the formed articles of the present invention, is illustrated by the following:

(1) The polymer formed from reacting p,p'-dicarboxy diphenyl sulfone (sulfone acid) or derivative with 2,2-dimethyl-1,3-propanediol or derivative.

(2) A polymer similar to that in number 1 except 17 mole percent of the sulfone acid is replaced by a dicarboxylic acid such as terephthalic, isophthalic, o-phthalic, succinic, adipic, and sebacic.

(3) The polymer formed from reacting p,p'-dicarboxy diphenyl sulfone with 2-methyl butanediol.

(4) A polymer similar to number 3 but modified by other diacids as in number 2.

(5) The polymer formed from reacting equal molar amounts of terephthalic acid or derivative and p,p'-dicarboxy diphenyl sulfone or derivative with ethylene glycol or derivative.

Non-heat-setting sulfone-diol polymers have in common (a) the sulfone acid and (b) one or more of the following glycols: (1) ethylene glycol, (2) 2-methyl butanediol, (3) 2,2-dimethyl-1,3 propanediol, and (4) other glycols described more specifically elsewhere in this case. Certain other additives such as diacids or diols may be copolymerized with these materials. Each glycol decreases crystallizability and changes the melting temperature to a different extent. Thus, with respect to sulfone acid-ethylene glycol polymer which melts so high as to render processing difficult some terephthalic acid may be added during polyesterification to produce a polymer with a lower melting temperature. For example, for making film or sheet, the sulfone component might constitute 25–100 mole percent. One or more dibasic acids such as terephthalic, isophthalic, 4,4'-diphenyl dicarboxylic or the like might be present from a small amount up to 75 mole percent and sufficient of the diol would be present to react with the acids. Or, acids such as succinic, malonic (as 2,2-dimethyl malonic acid) while being utilizable to 50 mole percent, in many instances would preferably be present only up to 25 mole percent.

The exact chemical composition per se of the type polymer described herein as the non-heat-setting sulfone-diol type polymer, and its method of preparation, are not part of the present invention. However, we do consider that our invention does extend to the combination of the process described herein as applied to such non-heat-setting sulfone-diol type polymers. For further completeness of disclosure, some additional general description will be set forth relative to the non-heat-setting sulfone-diol polymer compositions and their method of manufacture.

One process for preparing a linear polymer of the non-heat-setting sulfone-diol type comprises (A) condensing the desired mole proportions (say about 10 mole) of a p,p'-sulfonyl dibenzoic diester having the formula:

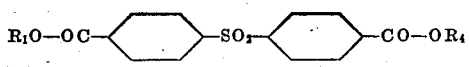

(wherein $R_1$ and $R_4$ each represents a substituent selected from the group consisting of a $\beta$-hydroxyalkyl radical containing from 2 to 4 carbon atoms, an omega-hydroxyalkyl radical containing from 3 to 12 carbon atoms, and an alkyl radical containing from 1 to 6 carbon atoms, plus from about 1 to about 30 mole proportions of an aliphatic diester selected from those having the following formula:

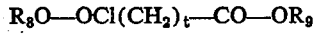

(wherein $t$ represents a positive integer of from 2 to 18, inclusive, and $R_8$ and $R_9$ each represents a substituent selected from the group consisting of an omega-hydroxyalkyl radical containing from 2 to 12 carbon atoms and an alkyl radical containing from 1 to 6 carbon atoms), with (B) a dioxy compound selected from the group consisting of those compounds having the following formula:

(wherein $R_5$ and $R_6$ each represents a substituent selected from the group consisting of a hydrogen atom and an acyl radical containing 2 to 4 carbon atoms and $R_{10}$ represents an acyl radical containing 2 to 12 carbon atoms). If $R_{10}$ has more than 3 carbon atoms it must be either branched or cyclic in nature and branching must increase as the number of carbon atoms increases. Branches should contain no more than one or two carbon atoms. The preferred range is 2 to 6 carbon atoms with the branches such that the hydroxy and alkoxy groups are primary. The dioxy compound is employed in such a proportion that there is at least an equivalent amount of oxy substituents in proportion to the carbalkoxy substituents in the over-all combination of the diesters and the dioxy compound.

The condensation is carried out in the presence of a condensing agent in an amount of from about 0.005% to about 0.2% based on the weight of the diesters employed, selected from the group consisting of the alkali metals, the alkaline earth metals, the oxides of these two groups of metals, the alkoxides containing from 1 to 6 carbon atoms of these two groups of metals, the carbonates and borates of these two groups of metals and lead oxide. An elevated temperature is used and the condensation is preferably conducted in an inert atmosphere, the latter part of the condensation being conducted at a very low pressure of the inert atmosphere. Preferably the elevated temperature is increased gradually during the course of the condensation up to a temperature of from about 225° to about 310° C.

Another method of making the non-heat-setting sulfone-diol polymer briefly is as follows: A prepolymer is made by treating the reactants as just described for a much shorter time. This prepolymer is ground to a fine particle size. It is then heated to a temperature of 200°–290° C. in a vacuum with stirring or in a moving stream of hot nitrogen until a suitable molecular weight is reached.

However, irrespective of the particular method of preparing the non-heat-setting sulfone-diol type of polymer, a suitable quantity thereof is obtained for fabricating into formed articles and processing in accordance with the present invention.

In the broader aspects of our invention we have found that the sulfone-diol polymeric material may be formed into the desired shape by any one of several procedures. For example, the non-heat-setting sulfone-diol polymer may be melt extruded directly into films or fibers using standard equipment. However, we prefer in order to facilitate such formation, to incorporate into the non-heat-setting sulfone-diol polymer a content of various agents, exemplified by gamma-valerolactone, dibutyl sebacate, or the like, which facilitates the (formation) extrusion of these high melting polymeric materials into shaped articles.

After extruding or otherwise suitably forming the non-heat-setting sulfone-diol type of polymer into a sheet, fibers or the like, the additive for facilitating the formation is removed. One suitable method for removing the additive consists in submerging the formed article for a few seconds in mineral oil or a silicone oil first at around 160° C. and then at 220° C. The mineral oil used was of a type commercially available under the trade name Primol D. The silicone oil was Dow Corning Silicone fluid No. 550. Such treatment removes the agent added for facilitating formation of the article and the product is now ready for the further treatment in accordance with the present invention.

Rather than form the articles by melt formation as just described, it is possible to form the polymer into articles by other procedures. For example, the non-heat-setting sulfone-diol type of polymer of the present invention may be placed in solution in trifluoroacetic acid or mixtures of trifluoroacetic acid with tetrachlorethane or methylene chloride. Such solutions then may be converted into articles such as films or fibers in the usual way by casting on film forming surfaces or pumping through spinnerettes.

The formed products, formed as aforesaid, are then preferably given a relatively high temperature heat treatment. For example, the formed product, such as sheet or film, is heated in air or mineral oil to about 220–230° C. This will produce a tough, clear product. This result is unexpected since in heating other polymers such as polyester that far below their melting temperature, in most instances this increased their crystallinity and made them brittle and hazy. However, in the present invention this heat treatment at the onset may be very important, particularly for solvent cast non-heat-setting sulfone-diol polymer films in order that the formed product may be readily further processed by stretching and the like.

The formed non-heat-setting sulfone-diol polymeric article, preferably after having been subjected to a heat treatment as just described, is now ready for processing such as stretching. We have found that such stretching operations are best conducted at somewhat higher than usual stretching temperatures. Generally temperatures are used in the range of 135–190° C., about 165° C. being a particularly useful temperature. These temperatures are somewhat higher, as will be noted, than the 80–130° C. frequently used in the art for heating the polymeric material prior to stretching it. Within the preferred range of 135–190° C. of the present invention, the particular temperature to use for any non-heat-setting sulfone-diol polymer compositions will depend somewhat on the chemical composition of the polymer. A suitable estimate of the optimum temperature may be made by determining at what temperature a film measuring 1″ x ⅛″ by 0.005″ can be easily stretched to four times its original length with tweezers in an oil bath. The temperature should not be high enough to cause the film to neck down. The amount of stretch which is important can also be determined in this test. It also will vary with the particular polymeric composition under processing and usually should range from two to six times the original dimensions of the article being formed. That is, in making a fiber, the initially formed product would be stretched two to six times its original length. In the instance of film, the stretching may not only be lengthwise but across the width of the film.

After the shaped product has been stretched as aforesaid, a special treatment is applied to the non-heat-setting sulfone-diol polymer composition employed herein. While the usual treatment applied to ordinary polyesters is to "heat set" or "stabilize" them by heating the article at temperatures of about 150° C. under restraint, such treatment will not be operative in the present situation. We have found that the non-heat-setting sulfone-diol type of polymer may not be "set" by heating at any reasonable temperature.

However, we have further found that the non-heat-setting sulfone-diol shaped articles of the present invention after stretching as aforesaid, may be readily "set" by subjecting the shaped article to treatment with certain chemical vapors for a short period. That is, the stretched article such as stretched film is exposed to a fluid such as acetone vapors and/or liquid for a period of usually between ten seconds and six minutes.

The finished shaped article of non-heat-setting sulfone-diol polymer resulting from the chemical setting just referred to, exhibits improved properties. Stretched films or fibers having been subjected to a brief chemical treatment have relatively higher modulus, stiffness and heat distortion temperature as compared with usual polymeric materials treated by usual procedures. In further detail, a film fully treated in accordance with the present invention exhibits a heat distortion temperature of 230° C. as compared with only about 175° C. for polyester processed in the usual manner.

The finished shaped articles in accordance with the present invention also have the advantage of greater resistance to thermal and hydrolytic breakdown and in many cases because of the less expensive raw material cost in manufacturing the shaped products of the present invention, the cost of the finished shaped product is lower.

It can be seen, in recapitulation, that in the broader aspects our invention comprises the following steps:

A. Subjecting the initially shaped article to an extractive or the like treatment for removing agents which have been added to the polymer for facilitating its initial formation into the shaped article, B. The shaped article is then subjected to relatively high heating, for example, at a temperature above 200° C. but somewhat below the melting or softening point of the polymer, C. The shaped article is then stretched or drawn along one or more axes at the relatively higher drawing temperature within the range of 135–190° C., D. The drawn article is then set by exposure for a brief period to acetone, usually first to a vapor treatment and then by a liquid treatment.

The result of such treatment of non-heat-setting sulfone-diol shaped articles processed in accordance with the present invention is to produce a superior article exhibiting improved heat distortion properties and the like, as already pointed out above.

A further understanding of our invention will be had from a consideration of the following examples which are set forth to illustrate the preferred embodiment of the instant invention.

EXAMPLE I

A trifluoroacetic acid solution was made containing twenty percent of a polymer made from reacting p,p'-dicarboxy diphenyl sulfone component (sulfone acid) with 2,2-dimethyl 1,3-propanediol component. This polymer had an inherent viscosity of 0.7 to 60–40 phenol-tetrachlorethane at 0.25% concentration.

$$\left(\text{Inherent viscosity}=\text{l.n.}\ \frac{nr}{\text{conc.}}\right)$$

This dope was coated to a film on a Teflon coated steel plate. After drying, the film was quite brittle. However, on heating in a silicone oil bath at 230° C. for a few minutes it became clear and tough. It was then stretched to six times its original length at 165° C. in the silicone oil. It was then subjected to treatment with acetone vapor and thereafter with liquid acetone. A film quite tough in the direction of stretch was obtained.

Still further examples of the instant invention are set forth in Table 1 below. From this table it will be observed that a number of different types of polymeric compositions of the present invention were extruded into film using standard equipment. These films were about 30 mil thick and 4″ wide. The films were stretched one way and "set" under the conditions shown in Table 1.

The properties of these films are also shown in Table 1. The heat distortion temperature was determined by noting the point of 2% stretch when a film was heated using 55 lbs. per square inch tension. Resistance to solvent hazing was determined by plunging a piece of the film in methylene chloride. X-ray, density and birefringence were the standard methods used for determining orientation and crystallinity. Toughness was determined in the direction of stretch. The temperature of stretch in air is given and the ratio is that of the length of the unstretched to the stretched film.

In general when treating film in accordance with the present invention we prefer to apply both a first treatment with the chemical vapor and a second treatment with the chemical in liquid state. Without the vapor treatment the liquid treatment alone may cause some haze to form on the surface of the film.

Table 1

| Prod. | Polymer | Stretch (°C.) Temp. | Ratio | After-Treatment Technique | Film Quality | Resistance to Solvent Hazing | Heat Distortion Temp., °C. | Oriented and Crystalline |
|---|---|---|---|---|---|---|---|---|
| A | Sulfone acid with 17 mole percent succinic acid-pentanediol. | 100 | 1–4 | 15 sec. acetone vapor, then 15 sec. in liquid, then 150° C. 1 min. in air. | Tough clear | Good | 175 | Yes. |
| B | Sulfone acid-2,2-dimethyl-1,3-propanediol. | 100 | 1–6 | do | Brittle hazy | do | | Crystalized, not oriented. |
| C | do | 165 | 1–6 | do | Tough clear | do | 230 | Yes. |
| D | Same as B, except 17 mole percent sulfone acid replaced with terephthalic acid. | 165 | 1–6 | do | do | do | 225 | Yes. |
| E | Sulfone acid-2-methyl butanediol. | 145 | 1–6 | do | do | do | 200 | Yes. |
| F | Equimolar terephthalic and sulfone acids-ethylene glycol. | 145 | 1–6 | do | do | do | 220 | Yes. |
| G | Same as E | 145 | 1–6 | do | do | do | 200 | Yes. |

Still further examples illustrating our invention are as follows:

EXAMPLE II

A powdered polyester of the type described in Example I was mixed with gamma valerolactone and extruded in conventional polyester extrusion equipment into a filament. The gamma valerolactone was removed by passing the filament into a bath of Primol D at 160° C. and then into another bath at 220° C. This was done on a chilled roll so that the filament did not distort. The filament was then stretched lengthwise at 165° C. It was then exposed to acetone vapor for 15 seconds and then to acetone liquid for 15 seconds. The filament produced by this process was tough and had a heat distortion temperature of 230° C.

A filament was prepared by a similar treatment except it was stretched at 125° C. This filament was brittle.

EXAMPLE III

A filament was extruded and processed as in Example III except toluene vapor and liquid was used instead of acetone. Results were essentially the same.

It can be seen from the above examples that the heat distortion properties are much improved by the stretching at the higher temperature, and by use of the non-heat-setting sulfone-diol polymer.

While in the above description we have referred in particular to the production of a shaped article such as film and fibers, other shaped articles such as tubing, packaging boxes, etc. can be prepared. The shaped articles produced in accordance with the present invention, such as the film or sheets, may be used for photographic film base, wrapping materials and the like. As already mentioned, such shaped articles exhibit improved properties, particularly with respect to high modulus, high stiffness, high heat distortion temperature and good dimensional stability. The instant invention is also of particular importance in many instances in that it permits use of polymeric materials which are of lower cost, and by means of the present invention may be made into shaped articles having properties equal or superior to the properties of polymeric materials presently used for comparable purposes.

For convenience of reference, we may refer to the polymeric material generically as "non-heat-setting sulfone-diol" type. The various species thereunder, for convenience of reference, may be referred to as non-heat-setting sulfone-diol dicarboxylic species, or succinic species, etc.

While the use of mineral oil or silicone oil has been referred to for some of the heating baths, various other heating means such as air or Wood's metal may be used. Although the temperature of 200–230° C. referred to is preferred, higher temperatures up to 250° C. may be used. Other softening agents such as dimethyl formamide may be used. Other changes may be made such as various stretching mechanisms may be used and the films or fibers may be restrained in various types of clamps during the "setting" treatment.

We claim:

1. The process of forming shaped articles of improved properties from non-heat-setting sulfone-diol polymers which comprises forming the polymer into a shaped article, subjecting the article to a relatively high heating but below the melting point of the polymer, stretching the shaped article, and then setting the stretched, shaped article by exposure thereof for a short time to a chemical fluid consisting essentially of acetone.

2. The process of forming shaped articles of improved properties from non-heat-setting sulfone-glycol-terephthalic acid polymers which comprises forming the polymer into a shaped article, subjecting the article to a heating at above 200° C. but below the melting point of the polymer, stretching the shaped article at a temperature within the range of 135–190° C. and then setting the stretched article in acetone.

3. The process of forming shaped articles of improved properties from non-heat-setting sulfone-diol polymer wherein the diol is a branched chain diol, which comprises forming the polymer into a shaped article, subjecting the article to a heating at above 200° C. but below the melting point of the polymer, stretching the shaped article at a temperature within the range of 135–190° C. and then setting the stretched article in acetone.

4. A process of forming shaped articles from non-heat-setting sulfone-diol polymers which comprises dissolving the polymer in a trifluoro acetic acid solvent, forming a shaped article from the solution, removing the trifluoro acetic acid solvent, subjecting the substantially solvent free article to heating at about 220–230° C., stretching the article at a temperature within the range 135–190° C. and then setting the stretched shaped article in acetone.

5. A process of forming shaped articles from non-heat-setting sulfone-diol polymers which comprises melting the polymer, extruding the molten polymer into the form of the desired shaped article, subjecting the shaped article to stretching at a temperature within the range of 135–190° C. and at a stretch ratio of 1:6, and then setting the stretched article by a short exposure to acetone vapors.

6. The process of forming shaped articles of improved properties from non-heat-setting polyester polymers which comprises forming the shaped article from said polymer, subjecting the shaped article to heating at a temperature above 200° C. but below the melting point of the polymer, drawing the shaped article and setting the drawn article by exposure thereof to a chemical fluid consisting essentially of acetone.

7. A process in accordance with claim 6 wherein the exposure is first to a vapor treatment followed by a liquid treatment.

8. In the process for the after-treatment of attenuated articles made from high polymers the improvement steps which comprise stretching said articles and then treating the stretched article in a chemical fluid consisting essentially of acetone.

References Cited in the file of this patent

UNITED STATES PATENTS

| | | |
|---|---|---|
| 2,347,545 | Dreyfus | Apr. 25, 1944 |
| 2,534,366 | Noether | Dec. 19, 1950 |
| 2,856,636 | Scholken et al. | Oct. 21, 1958 |

FOREIGN PATENTS

| | | |
|---|---|---|
| 678,576 | Great Britain | Sept. 3, 1952 |
| 1,066,203 | France | June 3, 1954 |